United States Patent [19]

Tanaka et al.

[11] Patent Number: 4,843,903
[45] Date of Patent: Jul. 4, 1989

[54] INTERMITTENT DRIVE FOR A PAPER SUPPLY ROLLER

[75] Inventors: Hironori Tanaka; Masafumi Matsumoto; Matahira Kotani, all of Nara, Japan

[73] Assignee: Sharp Kabushiki Kaisha, Osaka, Japan

[21] Appl. No.: 113,431

[22] Filed: Oct. 27, 1987

Related U.S. Application Data

[63] Continuation of Ser. No. 813,824, Dec. 27, 1985, abandoned.

[30] Foreign Application Priority Data

Dec. 27, 1984 [JP] Japan .................. 59-280768

[51] Int. Cl.⁴ .............................................. F16H 3/34
[52] U.S. Cl. .................................. 74/354; 74/210; 74/213; 271/10; 271/114; 271/121; 192/20; 192/48.6
[58] Field of Search ............. 192/20, 21, 48.6, 48.92; 74/210, 213, 354, 352; 400/569, 624, 625, 629, 636, 636.2; 271/10, 114, 121, 124, 125

[56] References Cited

U.S. PATENT DOCUMENTS 3,094,882 6/1963 Roberts ............................ 74/210
3,528,309 9/1970 Laybourn ......................... 74/213
4,606,663 8/1986 Christoph et al. ............... 400/569

FOREIGN PATENT DOCUMENTS 3887 1/1983 Japan .............................. 400/569
58777 3/1986 Japan .............................. 400/624

Primary Examiner—Rodney H. Bonck
Assistant Examiner—David A. Testardi
Attorney, Agent, or Firm—Birch, Stewart, Kolasch & Birch

[57] ABSTRACT

An intermittent drive mechanism includes, a continuously rotating driving gear; a subordinately driven gear disposed in a position close to the driving gear, an epicyclic gear being held in such a manner that it can be engaged with the driving gear by its own rotation along the periphery of the driven gear which remains engaged with the epicyclic gear, and a shifting plate that causes the epicyclic gear to be either engaged with the driving gear or disengaged from it by its movement. In response to movement of the shifting plate, when the epicyclic gear is engaged with the driving gear, the rotation force of the driving gear is transmitted to the subordinately driven gear via the epicyclic gear, whereas the transmission of the rotation force is discontinued when the epicyclic gear is disengaged from the driving gear, and, as a result, the subordinately driven gear is intermittently driven.

4 Claims, 2 Drawing Sheets

INTERMITTENT DRIVE FOR A PAPER SUPPLY ROLLER

This is a continuation, of application Ser. No. 813,824 filed on Dec. 27, 1985, now abandoned.

BACKGROUND OF THE INVENTION

1. Field of the Invention

The present invention relates to a device that intermittently transmits a driving force suitable for driving, the paper supply roller of, for example a facsimile machine, an optical character reader (OCR), or a printer.

2. Description of Prior Art

Any conventional paper supply device incorporated in data transmission equipment such as a facsimile needs to intermittently feed paper. Conventionally, rollers for supplying papers are intermittently driven by using electromagnetic clutch means. FIG. 1 represents the conventional structure of a paper supply device for a facsimile. First, an explanation of such a conventional paper supply device is given. Any conventional paper supply device is provided with a stacker 1 which loads paper 2, and a paper supply path between a lower guide plate 3 and an upper guide plate 4 for conveying the paper 2 to the left-end of the mechanism shown in FIG. 1. A paper forwarding roller 6 is provided at the end of stacker 1 to make a pair in combination with a pressure roller 5 which is pushed down by a spring (not shown in FIG. 1), thus making it possible to carry forward one or several sheets of paper 2 by the rotation of the paper forwarding roller 6 in the arrowed direction. A separation plate 9 is provided in a position right above a paper supply roller 7 and which is pressed against the surface of the paper supply roller 7 by a spring 8. When the paper supply roller 7 rotates in the arrowed direction, only the sheet on the bottom is separated from the rest of papers 2 and carried to the left. A reader 11 is provided in a position forward of the paper supply roller 7, where the first paper feed roller 12 and second paper feed roller 13 are provided to respectively make up pairs in combination with pinch rollers 14 and 15. The delivered paper 2 then passes through the paper supply path between a lower guide plate 16 and an upper guide plate 17 before eventually being delivered to a discharger 18 shown at the left of FIG. 1. A light source 19 illuminates the paper supply path, while light reflected from the paper supply path is directed to the optical character reader (not shown). The length of each roller correctly matches the width of the papers 2, or a plurality of rollers are aligned to the correct width. FIG. 2 shows an example of a conventional driving mechanism of the paper supply device shown in FIG. 1. The driver unit is provided respectively with a paper forwarding gear 6a coaxially installed together with the paper forwarding roller 6, a paper supply gear 7a coaxially coupled to the paper supply roller 7, a driver gear 12a coaxially coupled to the paper feed roller 12 and a pulley 12b, a driver pulley 21 driven by a motor (not shown), and a belt 22. The driver gear 12a is driven by the driver pulley 21 via the belt 22, while the rotation force of the driver gear 12a is transmitted to the paper forwarding gear 6a via an idler gear 23, the paper supply gear 7a, and a further idler gear 24, respectively. The rotation force of the paper forwarding gear 6a is transmitted to the paper forwarding roller 6 only when an electromagnetic clutch 26 is activated. The paper forwarding roller 6 is intermittently driven in response to the ON/OFF operation of the electromagnetic clutch 26, so that papers can be supplied intermittently. The other pulley 13b, driven by the belt 22, is also coaxially coupled to the second paper supply roller 13, while the paper supply rollers 12 and 13 are constantly rotated by the pulleys 12b and 13b. As a result, papers 2 which were intermittently supplied by these means are then continuously carried by the paper supply rollers 12 and 13. In particular, when operating a facsimile machine, papers 2 are intermittently supplied to the reader 11 from stack 1, but continuously sent forward when passing through the reader 11, as a result, the paper supply device needs to execute both intermittent and continuous paper supply operations. There are two methods of executing these operations, either by employing a single driver system as described above, or by providing a driver system for each function. When executing these two functions by applying a dual driver system, although the driving force can be transmitted by using a relatively simplified mechanical structure, it results in greater overall size of the structure, making it difficult to meet the need for compactness. In light of such requirements, the conventional driver mechanism uses a single driver system as shown in FIG. 2. However, when a single driver system is applied, the mechanical structure unavoidably becomes complex, moreover, a clutch mechanism is needed for executing intermittent driving. To compensate for this, an electromagnetic clutch is often used. However, when an electromagnetic clutch is introduced, the major cost of the intermittent driver mechanism is the electromagnetic clutch, and since a compact electromagnetic clutch is quite expensive, it adversely affects the total cost. In addition, since the transmission force and performance of the driver mechanism significantly depend on the precision of the component parts of electromagnetic clutches, a realization of the higher reliability of the intermittent driving mechanism will eventually result in higher cost. Furthermore, conventional techniques still need to apply special processes to the shafts before installing the electromagnetic clutches, thus involving higher production costs.

OBJECTS AND SUMMARY OF THE INVENTION

Object of the Invention

In order to completely solve the disadvantages thus far mentioned, the present invention provides an extremely useful intermittent drive mechanism of simple mechanical structure, allowing the realization of compact size and reduced cost.

Another object of the present invention is to provide a compact intermittent paper supply system applicable to a facsimile machine.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from the following detailed description.

SUMMARY OF THE INVENTION

To securely realize the above objects, the present invention provides a novel mechanism consisting of a driving gear that continuously rotates, a driven gear disposed in a position close to the driving gear, an epicyclic gear being held so as to engage with the driving gear by its rotation along the periphery of the driven gear, and a shifting or transfer means that causes the epicyclic gear to be either engaged with or disengaged from the driving gear by the movement of the epicyclic gear. The paper supply device embodied by the present invention causes the epicyclic gear to be engaged with the driving gear to transmit the rotating force of the driving gear to the driven gear via the epicyclic gear, whereas the transmission of the rotation force is discontinued when the epicyclic gear is disengaged from the driving gear, and, as a result, in response to the activation of the transfer means, the driven gear is intermittently driven.

BRIEF DESCRIPTION OF THE DRAWINGS

The present invention will be better understood from the detailed description given hereinbelow and the accommpanying drawings which are given by way of illustration only, and thus and not limitative of the present invention and wherein.

DETAILED DESCRIPTION OF THE PREFERRED EMBODIMENTS

Figure 1:
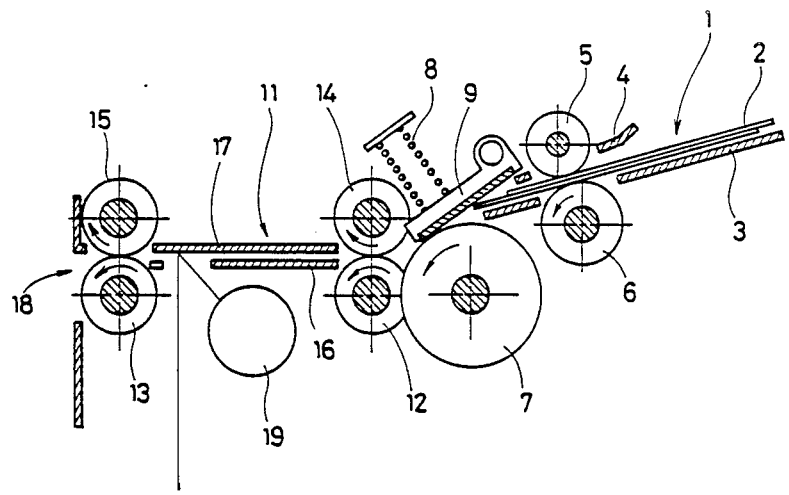
FIG. 1 is a sectional view denoting the overall structure of a paper supply/feeding device reflecting a conventional system.
Figure 2:
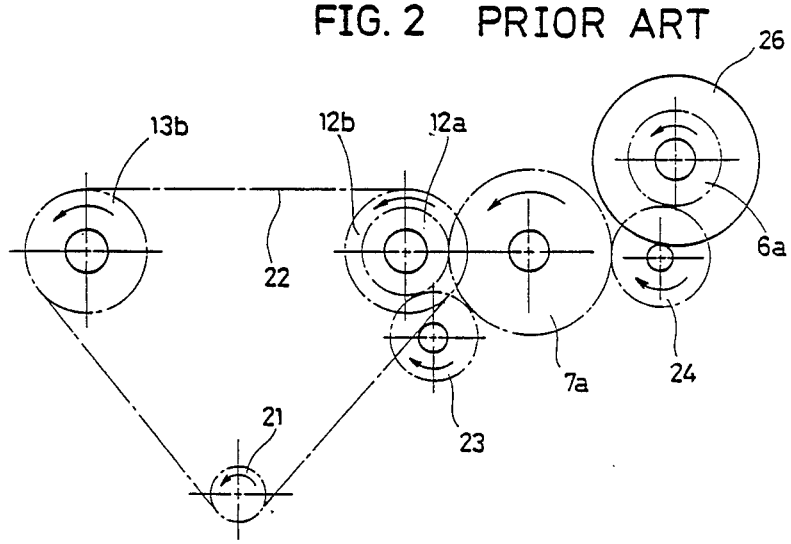
FIG. 2 is a sectional view representing a cconventional intermittent driving mechanism of the device of FIG. 1.
Figure 3:
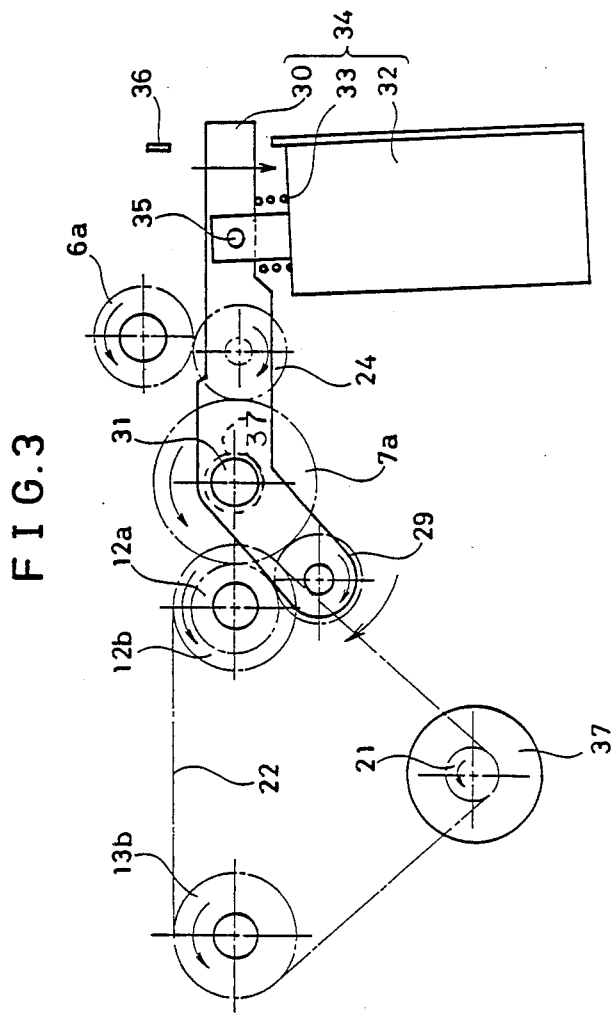
FIG. 3 is a sectional view denoting one of the preferred embodiments of the intermittent driving mechanism reflecting the present invention.

FIG. 3 is a cross-sectional view denoting one of the preferred embodiments of the intermittent drive mechanism reflecting the present invention. Like elements corresponding to those of FIGS. 1 and 2 are indicated by like numerals. The preferred embodiment shown in FIG. 3 uses components including an epicyclic gear 29, a support plate or arm 30, and a shaft 31 of the paper supply gear 7a. The support plate 30 is installed against the shaft 31 so that it can pivot freely. The epicyclic gear 29, which is supported at one end of the support plate 30 is engaged with the paper supply gear 7a so that the epicyclic gear 29 can rotate itself along the periphery of the paper supply gear 7a by the pivoting of the support plate 30 about shaft 31.

A the transfer or shifting means 34 consists of the support plate 30, a DC solenoid 32, and spring 33. When the DC solenoid 32 is activated, a plunger shaft 35 is drawn downward to cause the support arm of plate 30 to pivot clockwise in the arrowed direction and engage the epicyclic gear 29 with the driving gear 12a. Conversely, when the DC solenoid 32 is deactivated, the support plate 30 pivots counterclockwise due to the energized force of spring 33 so that the epicyclic gear 29 can be disengaged from the driving gear 12a. In addition to those components thus far described, the preferred embodiment shown in FIG. 3 further includes a stopper unit 36 stopping the movement of the support plate 30 and a drive motor 37 driving the driver pulley 21. In this embodiment, the paper supply gear 7a concurrently functions as a driven gear. In response to the ON/OFF operations of the DC solenoid 32, the driving force is either transmitted to the paper supply gear 7a via the epicyclic gear 29 or cease to transmit to it, and, as a result, both the paper supply gear 7a and the paper forwarding gear 6a are intermittently driven. Note that, since the DC solenoid 32 needs output capacity just enough to pivot the support plate 30 so that the epicyclic gear 29 can move, the DC solenoid 32 may be of small configuration and inexpensive. In addition, since the DC solenoid 32 needs a simple structure or less space for installation, it is possible to easily realize compactness and reduced cost as well as to improve performance.

When the papers 2 arrive at the position of the paper feeding roller 12 from the stacker 1 after being intermittently driven by the above mechanism, they are then subjected to a continuous forwarding operation, causing the paper supply roller 7 to continue rotating in a forward direction until the papers 2 eventually pass through it. As a result, it is necessary to prevent the paper forwarding gear 6a from rotating by itself due to unwanted transmission of the rotation force of the paper supply roller 7 and the shaft 31 to the paper supply gear 7a. To prevent this, the preferred embodiment shown in FIG. 3 provides a one-way clutch 37 between the paper supply gear 7a and the arm 30 about shaft 31 in order to prevent the paper supplying gear 7a from rotating, even if both the paper supply roller 7 and the shaft 31 rotate together while the DC solenoid 32 remains OFF. As a result, no driving force can be transmitted to the paper forwarding gear 6a. Note that, in this embodiment, a detailed description has been given with reference to a facsimile machine, however, the preferred embodiments of the present invention can be effectively applied not only to other intermittent paper feeding devices in addition to those which have been described above, but also to a wide variety of devices requiring intermittent transmission of a driving force.

As is clear from the foregoing detailed description, in this preferred embodiment of the present invention, the epicyclic gear, engaged with the driven gear, shifts its own position for engagement with the driving gear, and therefore, although operating the single driving system to execute both continuous and intermittent driving operations, an extremely simple construction for the entire mechanism can be realized. At the same time, the preferred embodiment can effectively use an inexpensive and compact driving source, such as a DC solenoid, for shifting the position of the epicyclic gear, thus eventually providing a number of advantages, including compactness, remarkably reduced cost, and significant improvements in total performance.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An intermittent drive mechanism for intermittently transmitting a driving force to a paper supply roller of a data transmission device comprising in combination:

a paper forwarding gear coaxially coupled with a paper forwarding roller;

a continuously rotating driving gear coaxially coupled to a paper feed roller;

a subordinate paper supply driven gear juxtapositioned to said driving gear, coaxially coupled with the paper supply roller about a shaft and coupled with the paper forwarding gear;

an epicyclic gear engaged with a periphery of said driven gear positioned so as to engage said driving gear and transmit the rotation of said driving gear to said driven gear;

shifting means which causes said epicyclic gear to be either engaged with or disengaged from said driving gear, said shifting means including an arm pivotable about said paper supply driven gear shaft which rotatably supports said epicyclic gear at one end thereof;

a DC solenoid for selectively activating said pivotable arm in a predetermined direction for shifting the position of said epicyclic gear to engage said driving gear and a spring biasing means for biasing said pivotable arm in a direction opposite from said predetermined direction such that said epicyclic gear is disengaged from said driving gear attached to a second end of said pivotable arm; and a one-way clutch between said paper supply driven gear and said paper supply driven gear shaft, to prevent said paper forwarding gear from unwanted rotation transmitted thereto by said paper supply driven gear after said solenoid is off.

2. The intermittent drive mechanism of claim 1, further including an idler gear positioned between said paper forwarding gear and said paper supply driven gear.

3. A data transmission system comprising in combination:

a data transmission device, and a compact intermittent paper supply drive mechanism for intermittently transmitting a driving force to a paper supply roller of said data transmission device, said intermittent drive mechanism including in combination a paper forwarding gear coaxially coupled with a paper forwarding roller, a continuously rotating driving gear coaxially coupled to a paper feed roller;

a subordinate paper supply driven gear juxtapositioned to said driving gear, coaxially coupled with the paper supply roller about a shaft and coupled with the paper forwarding gear;

an epicyclic gear engaged with a periphery of said driven gear positioned so as to engage said driving gear and transmit the rotation of said driving gear to said driven gear;

shifting means which causes said epicyclic gear to be either engaged with or disengaged from said driving gear, said shifting means including an arm pivotable about said paper supply driven gear shaft which rotatably supports said epicyclic gear at one end thereof; a DC solenoid for selectively activating said pivotable arm in a predetermined direction for shifting the position of said epicyclic gear to engage said driving gear and a spring biasing means for biasing said pivotable arm in a direction opposite from said predetermined direction such that said epicyclic gear is disengaged from said driving gear attached to a second end of said pivotable arm; and a one-way clutch between said paper supply driven gear and said paper supply driven gear shaft, to prevent said paper forwarding gear from unwanted rotation transmitted thereto by said paper supply driven gear after said solenoid is off.

4. The data transmission system of claim 3, wherein said data transmission device is selected from a facsimile machine, an optical character reader and a printer.

* * * * *